United States Patent [19]
Ames

[11] Patent Number: 6,111,820
[45] Date of Patent: Aug. 29, 2000

[54] SEMI-RIGID LOW-NOISE INTERLINK FOR SPATIALLY EXTENDED HYDROPHONES

[75] Inventor: Gregory H. Ames, South Kingstown, R.I.

[73] Assignee: The United States of America as represented by the Secretary of the Navy, Washington, D.C.

[21] Appl. No.: 09/412,198

[22] Filed: Oct. 4, 1999

[51] Int. Cl.[7] ..................................................... H04R 1/44
[52] U.S. Cl. ........................................... 367/173; 367/154
[58] Field of Search .............................. 367/20, 149, 153, 367/154, 173

[56] References Cited

U.S. PATENT DOCUMENTS

| | | | |
|---|---|---|---|
| 4,809,243 | 2/1989 | Bledsoe et al. | 367/154 |
| 5,737,278 | 4/1998 | Frederick et al. | 367/149 |
| 5,748,565 | 5/1998 | Cherbettchian et al. | 367/154 |
| 5,883,857 | 3/1999 | Pearce | 367/20 |

*Primary Examiner*—Ian J. Lobo
*Attorney, Agent, or Firm*—Michael J. McGowan; Kevin A. Oliver; Prithvi C. Lall

[57] ABSTRACT

A hydrophone interlink that connects hydrophone elements and allows a single sensing fiber to transition between hydrophone elements. The interlink has an outer-structure and a contained element. The outer-structure connects the hydrophone elements and has at least one turn such that the distance traveled along the turns exceeds the linear distance between hydrophone elements. The outer-structure material and shape allow temporary interlink stretching and compression during passes through handling sheaves, with memory to allow the interlink to return to its original shape. The outer-structure contains a groove on either end to transition the sensing fiber between the hydrophone elements and the contained element. The contained element is open cell foam that fills the hollow core of the outer-structure. The sensing fiber transitions from a first hydrophone element to immediately enter the feed at the interlink first outer-structure end, whereupon the fiber transitions to the open cell foam and follows the interlink outer-structure structure while remaining on the foam.

7 Claims, 2 Drawing Sheets

SEMI-RIGID LOW-NOISE INTERLINK FOR SPATIALLY EXTENDED HYDROPHONES

CROSS-REFERENCE TO RELATED APPLICATIONS

This patent application is co-pending with a related patent application entitled Interlink for Spatially Extended Hydrophones Ser. No. 09/412,196, now allowed, by the same inventor as this patent application, and a related application entitled Reduced Mechanical Coupling Interlink for Spatially Extended Hydrophones Ser. No. 09/412,197, now allowed, by the same inventor with two additional co-inventors.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

(1) Field of the Invention

The present invention relates generally to connecting hydrophone elements in linear arrays, and more particularly to a means for connecting hydrophone elements to pass a sensing material, such as optical fiber, from one hydrophone element to another without adversely affecting the sensing material or measurement sensitivity.

(2) Description of the Prior Art

Hydrophone is a generic term describing a transducer that detects or monitors underwater sound. Hydrophones are typically pressure-actuated sensors and form the basis of sonar systems. Fiber-optic hydrophones employ fiber-optic cabling to sense pressure generated by acoustic wavefronts. Acoustic wavefront pressure produces measurable phase differences in the light waves guided by optical fiber.

A fiber-optic hydrophone typically includes a hollow, air-backed element known as a mandrel, with optical fiber wound on the mandrel surface. The advantages of multiple, smaller, interconnected elements when compared to a single larger element, are presented in U.S. Pat. No. 5,317,544, and such advantages include increased sensitivity and system robustness during deployment. Although prior art discusses the need to connect multiple mandrel-wound hydrophones in series with a single fiber, the interlink's design and material is often ignored. U.S. Pat. No. 5,317,544 mentions a means for compliantly connecting adjacent hydrophone components, while U.S. Pat. No. 5,475,216 claims a neoprene spacer, and U.S. Pat. No. 5,155,548 describes a spacer preferably formed of neoprene. Neoprene spacers or interlinks induce undesirable phase noise in the sensing fiber.

There is currently not a hydrophone interlink that allows a hydrophone array to pass through large bends across small diameter handling sheaves during array deployment, without placing excessive stress on the interlink or sensing fiber; and, there is not an interlink that additionally couples the sensing fiber to a structure such that the fiber is impervious to the structure's mechanical resonances.

What is needed is an interlink that is flexible during deployment, but during post-deployment (i.e., operation), ensures minimal fiber stretching from mechanical resonances of the interlink structure.

SUMMARY OF THE INVENTION

It is a general purpose and object of the present invention to provide a hydrophone interlink that connects two hydrophone elements while allowing a single sensing fiber to transition between the two hydrophones. It is a further object that such interlink be flexible during deployment to protect the sensing fiber as the interlink passes through small diameter handling sheaves. It is yet a further object that such interlink, during the post-deployment phase, ensures minimal sensing fiber stretching along the interlink from hydrophone array noise sources or the interlink structure's mechanical resonances, as such noise sources cause phase changes that interfere with hydrophone element signals.

Other objects and advantages of the present invention will become more obvious hereinafter in the specification and drawings.

The objects are accomplished with the present invention through a hydrophone interlink that allows a single sensing fiber to transition between hydrophone elements. The interlink has an outer-structure and a contained element. The outer-structure connects the hydrophone elements and has at least one turn such that the distance traveled along the turns exceeds the linear distance between hydrophone elements. The outer-structure material and shape allow temporary interlink stretching and compression during passes through handling sheaves, with memory to allow the interlink to return to its original shape. The outer-structure contains a groove on either end to transition the sensing fiber between the hydrophone elements and the contained element. The contained element is open cell foam that fills the hollow core of the outer-structure. The sensing fiber transitions from a first hydrophone element to immediately enter the feed at the interlink first outer-structure end, whereupon the fiber transitions to the open cell foam and follows the interlink outer-structure while remaining on the foam. At the second interlink end, the sensing fiber utilizes the feed at the interlink outer-structure second end to transition to a second hydrophone element. A groove may be created to guide the sensing fiber along the open cell foam.

BRIEF DESCRIPTION OF THE DRAWING

A more complete understanding of the invention and many of the attendant advantages thereto will be readily appreciated as the same becomes better understood by reference to the following detailed description when considered in conjunction with the accompanying drawings, wherein like reference numerals refer to like parts, and wherein.

DESCRIPTION OF THE PREFERRED EMBODIMENT

Figure 1:
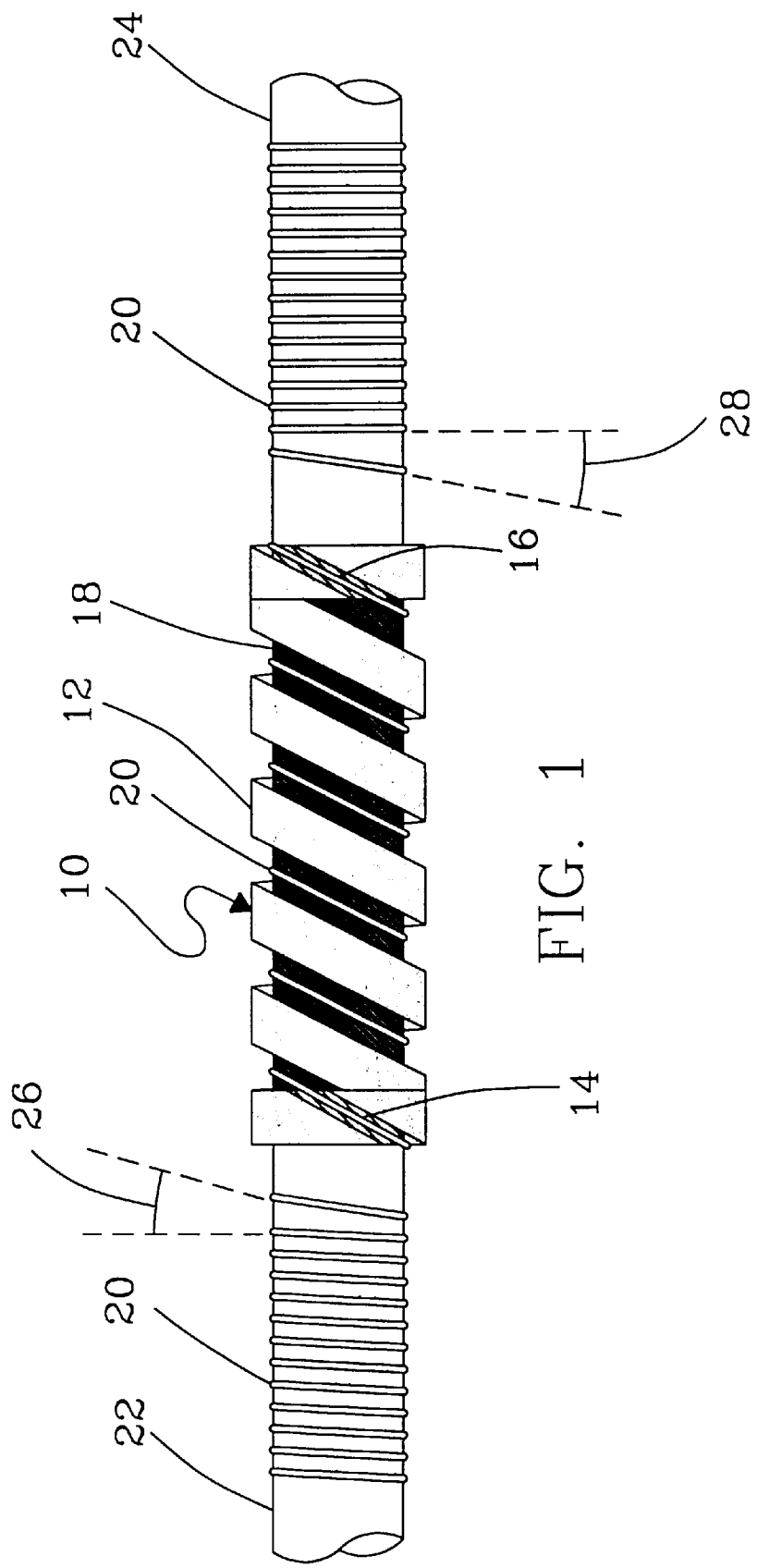
FIG. 1 shows an interlink connecting two hydrophone hydrophone elements.

Referring now to FIG. 1, there is shown an interlink 10 with a helical spring outer-structure 12 for connecting hydroacoustic elements. FIG. 1 represents an interlink connecting optical fiber hydrophone elements known as mandrels. The helical spring outer-structure 12 provides flexibility for bending in handling systems without damaging the interlink, with memory to return the interlink to the original shape after passing through the handling system. FIG. 1 also shows feeds 14, 16 at either interlink end. The interlink 10 additionally comprises a hollow, circular core that is formed by the helical outer-structure 12, the core being filled with open cell foam 18. At the interlink ends, the feeds 14, 16 transition the optical fiber 20 between the hydrophone elements 22, 24 and the open cell foam 18.

FIG. 1 shows a first hydrophone hydrophone element 22 with optical fiber 20 wound directly on the mandrel surface. With optical fiber 20 wound from left to right as shown, as the end of the first hydrophone hydrop hone element occurs, the optical fiber winding angle 26 changes to allow the interlink feed 14 to accept the optical fiber 20. The feed 14 transitions the optical fiber to the open cell foam 18 contained within the helical spring outer-structure 12, and the optical fiber 20 continues winding along the open cell foam 18. Although the optical fiber 12 follows the outer-structure 12 between the feeds 14, 16, the optical fiber 20 does not contact the interlink outer-structure 12 in the interlink region between the feeds 14, 16. In the interlink region between the feeds 14, 16, the optical fiber 20 contacts only the open cell foam 18. Although not indicated in FIG. 1, a groove may be created in the open cell foam 18 to guide the optical fiber 20 along the foam 18.

As the second interlink end is encountered, the optical fiber 20 is wound directly from the open cell foam 18 into the outer-structure feed 16 at the interlink end connected to the second hydrophone element 24, and onto the second hydrophone element 24. The optical fiber winding angle 28 is again adjusted to achieve the desired fiber winding for the second hydrophone hydrophone element 24.

For optical fiber acoustic applications, the interlink outer-structure 12 can be constructed of a relatively non-compliant material such as polycarbonate. The outer-structure interlink material selection is application dependent and should provide stability to protect the sensing fiber within the feeds, flexibility to expand or contract when required, and imperviousness to undesired effects (e.g., response to acoustic pressure). By filling the otherwise hollow outer-structure with open cell foam 18 and winding optical fiber 20 along the foam 18, the fiber is decoupled from the more rigid outer-structure 12 that can impose undue strain on the fiber 20 due to the outer-structure's mechanical resonances. The combination of more rigid outer-structure 12 and contained open cell foam 18 therefore provides a desirable rigid connection between hydrophone elements 22, 24 without adversely affecting the optical fiber 20 that is wound on the open cell foam 18.

Figure 2:
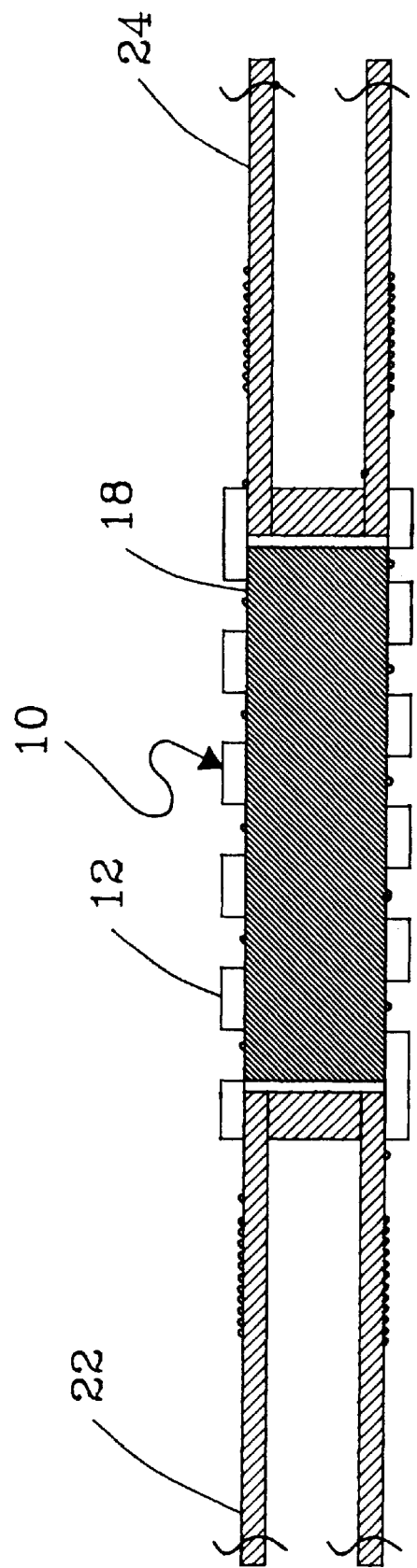
FIG. 2 shows a cross-section of the interlink of FIG. 1 taken through the longitudinal axis thereof.

Referring now to FIG. 2, there is shown a longitudinal cross-sectional view of FIG. 1 to detail the connections between the hydrophone elements 20, 22 and the interlink 10. In the preferred embodiment shown in FIG. 2, the interlink outer-structure 12 is connected to the hydrophone elements 22, 24 at either end, while the open cell foam 18 is not connected to the hydrophone elements 22, 24.

FIG. 2 displays a helical spring outer-structure 12 whose hollow interior internal circumference is slightly larger than the outer hydrophone hydrophone element circumference. The hydrophone element ends are inserted into the hollow interlink outer-structure ends and secured with epoxy or other bonding agent or process. Alternately, depending upon the interlink material and design, screws may be used to affix the interlink outer-structure 12 to the hydrophone elements 22, 24. The open cell foam 18 is not secured to the interlink outer-structure 12 or the hydrophone elements 22, 24 and maintains its positioning using the interlink outer-structure 12 and hydrophone elements 22, 24 for support.

The interlink of FIG. 1 and FIG. 2 is compatible with continuous fiber winding and assembly as the optical fiber 20 is wound directly from a first hydrophone element 22, through the interlink feed 14 to the open cell foam 18, across the open cell foam 18, through the second interlink feed 16, and to the second hydrophone element 24, with only a change in winding angle. The outer-structure 12 single piece construction additionally simplifies automated assembly and reduces material costs. The helical spring outer-structure 12 also provides offsetting stretching and compression effects while the interlink bends.

The advantages of the present invention over the prior art are that: The present invention provides an interlink that rigidly connects hydrophone elements, yet provides sufficient flexibility during deployment for large bends across small diameter handling sheaves; however, the sensing fiber is not coupled to a rigid structure, and therefore the sensing fiber is not subjected to a rigid interlink's undesirable mechanical resonances.

What has thus been described is an interlink for connecting hydrophone elements that allows a single sensing fiber to transition from a first hydrophone element, across the interlink, to a second hydrophone element, while providing a secure connection between hydrophone elements and decoupling the sensing fiber from rigid interlink material. The interlink has an outer-structure and a contained element. The outer-structure has a first end connected to a first hydrophone element, and a second end connected to a second hydrophone element. Between the outer-structure ends is at least one turn, and the distance traveled along the interlink turns is greater than the linear distance between the outer-structure ends. The outer-structure contains open cell foam in its hollow core, and the outer-structure contains a feed at either end to transition sensing fiber between the open cell foam and the hydrophone elements. Sensing fiber transitions from a first hydrophone element, into a feed embedded in the first outer-structure end, and onto the foam. The sensing fiber continues winding along the foam until the second interlink end is reached, whereupon the feed at the second outer-structure end transitions the sensing fiber to the second hydrophone element. The interlink turns and material provide flexibility for large bends through small handling sheaves, and elasticity to return to original form. A groove may be created in the foam to guide the sensing fiber. The sensing fiber is decoupled from the rigid interlink structure and its undesirable mechanical resonances.

Obviously many modifications and variations of the present invention may become apparent in light of the above teachings. For example: Interlinks may have many designs, and although a helical spring was shown, various shapes may be used. There are many spring types and springs of the same type have different spring constants or stiffness. The interlink outer-structure may have a cross-section that is not round. Foams other than open cell foam may be contained within the outer-structure, and the foam may optionally be secured to the hydrophone elements or the outer-structure. The sensing fiber may be guided along the foam with a groove. The interlink may have any number of turns, depending upon the application and desire for flexibility. The interlink may be connected to the hydrophone elements in a variety of manners. Although the application shown included fiber-optic hydrophones, the same interlink may be used to connect hydrophone elements other than fiber-optic elements, where flexibility, elasticity, and the other interlink characteristics are desired. Multiple interlinks can connect multiple hydrophones in series.

In light of the above, it is therefore understood that within the scope of appended claims, the invention may be practiced otherwise than as specifically described.

What is claimed is:

1. An interlink for connecting a first hydrophone element and a distinct second hydrophone element comprising:
   an outer-structure having a hollow interior;
   open cell foam encapsulated within said outer-structure;
   a first interlink end of said outer-structure for connecting to said first hydrophone element;
   a distinct second interlink end of said outer-structure for connecting to said second hydrophone element;
   means for affixing said first and second interlink ends to said first and second hydrophone elements, respectively;
   at least one turn between said first interlink end and said second interlink end, such that the distance traveled along said at least one turn is greater than the linear distance between said first and second interlink ends;
   a first feed on said first interlink end; and
   a distinct second feed on said second interlink end.

2. The interlink of claim 1 wherein said at least one turn further comprises an interlink shape with elasticity and memory.

3. The interlink of claim 2 wherein said at least one turn forms a helical spring.

4. The interlink of claim 1 wherein the means to affix said first and second interlink ends to said first and second hydrophone elements, respectively, comprises epoxy.

5. The interlink of claim 1 wherein the means to affix said first and second ends to said first and second hydrophone elements, respectively, comprises screws.

6. The interlink of claim 1 wherein said outer-structure is formed of polycarbonate.

7. The interlink of claim 1 wherein said open cell foam encapsulated within said outer-structure further comprises a groove.

* * * * *